United States Patent
Takahashi et al.

(10) Patent No.: US 12,215,238 B2
(45) Date of Patent: Feb. 4, 2025

(54) CLEAR INK, PRINTING METHOD, AND INKJET PRINTING APPARATUS

(71) Applicants: Hiroaki Takahashi, Kanagawa (JP); Kiminori Masuda, Tokyo (JP); Mayumi Yoshihara, Kanagawa (JP)

(72) Inventors: Hiroaki Takahashi, Kanagawa (JP); Kiminori Masuda, Tokyo (JP); Mayumi Yoshihara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 519 days.

(21) Appl. No.: 17/715,957

(22) Filed: Apr. 8, 2022

(65) Prior Publication Data

US 2022/0363927 A1 Nov. 17, 2022

(30) Foreign Application Priority Data

May 13, 2021 (JP) .................. 2021-081497

(51) Int. Cl.
*C09D 11/30* (2014.01)
*B41J 2/21* (2006.01)
*B41M 5/00* (2006.01)
*C09D 11/033* (2014.01)
(Continued)

(52) U.S. Cl.
CPC ............ *C09D 11/30* (2013.01); *B41J 2/2114* (2013.01); *B41M 5/0023* (2013.01); *C09D 11/033* (2013.01); *C09D 11/102* (2013.01); *C09D 11/54* (2013.01)

(58) Field of Classification Search
None
See application file for complete search history.

(56) References Cited

U.S. PATENT DOCUMENTS

| | | |
|---|---|---|
| 2015/0191614 A1 | 7/2015 | Nagashima et al. |
| 2016/0264808 A1* | 9/2016 | Kido .................. C09D 11/106 |
| 2017/0158892 A1 | 6/2017 | Takahashi et al. |

(Continued)

FOREIGN PATENT DOCUMENTS

| | | |
|---|---|---|
| JP | 2013-212644 | 10/2013 |
| JP | 2015-147919 | 8/2015 |

(Continued)

OTHER PUBLICATIONS

Extended European Search Report issued Oct. 6, 2022 in European Patent Application No. 22166846.0, 6 pages.

*Primary Examiner* — Richard A. Huhn
(74) *Attorney, Agent, or Firm* — XSENSUS LLP

(57) ABSTRACT

A clear ink includes resin particles, water, and a compound represented by General Formula (1) below. The resin particles have a volume average particle diameter of 50 nm or less. A dried film of the clear ink has glass transition temperatures (Tg) at 50 degrees Celsius or higher and at lower than 0 degrees Celsius.

General Formula (1)

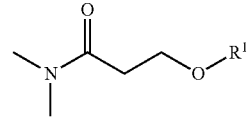

In the General Formula (1), $R^1$ represents an alkyl group having 1 or more but 4 or less carbon atoms.

9 Claims, 2 Drawing Sheets

(51) Int. Cl.
    *C09D 11/102*     (2014.01)
    *C09D 11/54*     (2014.01)

(56) References Cited

U.S. PATENT DOCUMENTS

| | | |
|---|---|---|
| 2017/0361632 A1 | 12/2017 | Toyama et al. |
| 2018/0208783 A1 | 7/2018 | Takahashi et al. |
| 2019/0185690 A1 | 6/2019 | Umemura et al. |
| 2019/0249020 A1 | 8/2019 | Matsuyama et al. |
| 2019/0381810 A1 | 12/2019 | Takahashi et al. |
| 2019/0381811 A1 | 12/2019 | Masuda et al. |
| 2020/0171832 A1 | 6/2020 | Akima et al. |
| 2020/0171839 A1 | 6/2020 | Takahashi et al. |
| 2020/0354597 A1 | 11/2020 | Takahashi et al. |
| 2021/0155012 A1 | 5/2021 | Gotou et al. |
| 2021/0170778 A1 | 6/2021 | Takahashi et al. |
| 2021/0237468 A1 | 8/2021 | Takahashi et al. |
| 2021/0362503 A1 | 11/2021 | Akima et al. |

FOREIGN PATENT DOCUMENTS

| | | | |
|---|---|---|---|
| JP | 2016-169370 A | | 9/2016 |
| JP | 2017190374 A | * | 10/2017 |
| JP | 2018-039913 A | | 3/2018 |
| JP | 2018-039946 A | | 3/2018 |
| JP | 2018-094851 A | | 6/2018 |

\* cited by examiner

CLEAR INK, PRINTING METHOD, AND INKJET PRINTING APPARATUS

CROSS-REFERENCE TO RELATED APPLICATIONS

This patent application is based on and claims priority pursuant to 35 U.S.C. § 119(a) to Japanese Patent Application No. 2021-081497, filed on May 13, 2021, in the Japan Patent Office, the entire disclosure of which is hereby incorporated by reference herein.

BACKGROUND

Technical Field

The present disclosure relates to a clear ink, a printing method, and an inkjet printing apparatus.

Description of the Related Art

Impermeable print media such as plastic films are used for commercial applications such as advertisement and signage and packaging materials for foods, beverages, and daily necessities in order to improve durabilities such as light resistance, water resistance, and wear resistance. Various inks to be used on such impermeable print media have been developed.

SUMMARY

According to one aspect of the present disclosure, a clear ink includes resin particles, water, and a compound represented by General Formula (1) below. The resin particles have a volume average particle diameter of 50 nm or less. A dried film of the clear ink has glass transition temperatures (Tg) at 50 degrees Celsius or higher and at lower than 0 degrees Celsius.

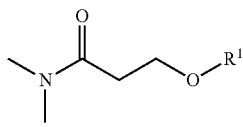

General Formula (1)

In the General Formula (1), $R^1$ represents an alkyl group having 1 or more but 4 or less carbon atoms.

According to one aspect of the present disclosure, a printing method includes: applying an ink containing a colorant; and applying the above-described clear.

According to one aspect of the present disclosure, an inkjet printing apparatus includes the above-described clear ink and a discharging unit configured to discharge the clear ink.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
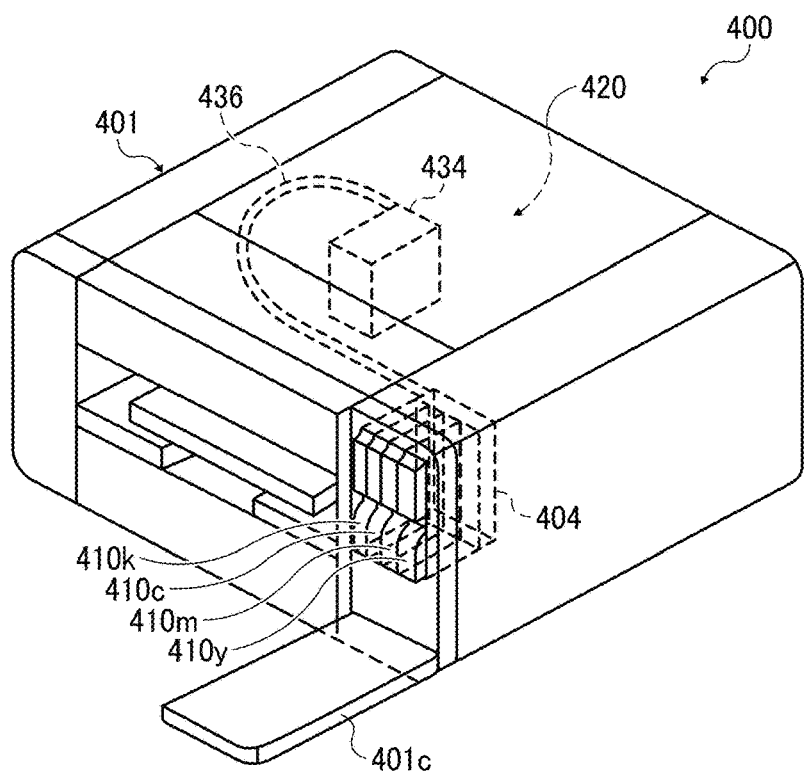
FIG. 1 is a schematic perspective view of a printing apparatus of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Various inks to be used on impermeable print media have been developed. As such inks, for example, solvent-based inks using an organic solvent as a solvent and ultraviolet-ray-curable inks containing a polymerizable monomer as a main component are widely used. However, solvent-based inks are feared to be environmentally hazardous through evaporation of the organic solvent, and ultraviolet-ray-curable inks may be limited in the options of polymerizable monomers to be used in terms of safety.

Hence, ink sets including water-based inks that have a low environmental impact and can be directly printed over impermeable print media have been proposed.

Problems of such water-based inks that can be directly printed over impermeable print media include scratch resistance, and methods for improving scratch resistance have been proposed.

The present disclosure can provide a clear ink that can form a coating film having excellent scratch resistance and being prevented from poor drying to have excellent blocking resistance.

(Clear Ink)

A clear ink of the present disclosure includes resin particles, water, and a compound represented by General Formula (1) above. The volume average particle diameter of the resin particles is 50 nm or less. A dried film of the clear ink has glass transition temperatures (Tg) at 50 degrees Celsius or higher and at lower than 0 degrees Celsius.

The clear ink of the present disclosure is based on a finding that existing inks are taken care of to have a better scratch resistance, but may not ensure a sufficient scratch resistance against various hazards in actual use.

According to existing techniques, the amount of resins to be contained in inks becomes necessarily high in order to improve scratch resistance. Therefore, inks may abruptly thicken or viscoelastic characteristics of inks may change due to drying. Hence, a sufficient discharging reliability may not be ensured.

As a result of conducting earnest studies into clear inks that can form coating films having excellent scratch resistance, the inventors of the present invention have found that a coating film having excellent scratch resistance and being prevented from poor drying to have excellent blocking resistance can be formed with a clear ink containing resin particles, water, and a compound represented by General Formula (1) above, wherein the volume average particle diameter of the resin particles is 50 nm or less, and wherein a dried film of the clear ink has glass transition temperatures (Tg) at 50 degrees Celsius or higher and at lower than 0 degrees Celsius.

The clear ink of the present disclosure includes resin particles, water, and a compound represented by General Formula (1) below.

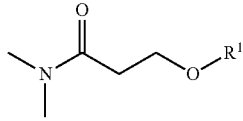

General Formula (1)

In the General Formula (1), $R^1$ represents an alkyl group having 1 or more but 4 or less carbon atoms.

The clear ink means a colorless, transparent ink that is substantially free of a colorant. Being substantially free of a colorant means that the proportion of a colorant in the clear ink is 0.5% by mass or less. The clear ink may contain a colorant as long as the proportion of the colorant is of an impurity level.

A water-based clear ink means a clear ink containing water as a solvent. The water-based clear ink may contain an organic solvent as needed.

The clear ink contains at least resin particles and water, preferably contains a surfactant, and further contains other components as needed.

<Resin Particles>

The kind of the resin of the resin particles contained in the clear ink is not particularly limited and may be appropriately selected depending on the intended purpose. Examples of the resin include, but are not limited to, polyurethane resins, polyester resins, acrylic resins, vinyl acetate-based resins, styrene resins, butadiene resins, styrene-butadiene resins, vinyl chloride resins, acrylic-styrene resins, and acrylic-silicone resins.

In production of the ink, the resin is added in the form of resin particles made of the resin. The resin particles may be added in the ink in the form of a resin emulsion dispersed in water serving as a dispersion medium. As the resin particles, an appropriately synthesized product may be used or a commercially available product may be used. These kinds of resin particles may be used alone or in combination.

The volume average particle diameter of the resin particles is 50 nm or less, and preferably 5 nm or greater but 40 nm or less. When the volume average particle diameter of the resin particles is 50 nm or less, a uniform clear ink coating film can be formed.

The volume average particle diameter of the resin particles can be measured with, for example, a particle size analyzer (NANOTRAC WAVE 11, available from MicrotracBEL Corporation).

A dried film of the clear ink has glass transition temperatures (Tg) at 50 degrees Celsius or higher and at lower than 0 degrees Celsius, preferably at 50 degrees Celsius or higher but lower than 100 degrees Celsius and at −50 degrees Celsius or higher but lower than 0 degrees Celsius. When a dried film of the clear ink has Tg at 50 degrees Celsius or higher and at lower than 0 degrees Celsius, a clear ink coating film has a better scratch resistance.

The resin particles contain at least two kinds of resin particles, namely resin particles A and resin particles B.

The glass transition temperature (Tg) of the resin particles A is preferably 50 degrees Celsius or higher and more preferably 50 degrees Celsius or higher but lower than 100 degrees Celsius. The resin particles A having the Tg of 50 degrees Celsius or higher provides a stiff coating film of the clear ink having increased scratch resistance.

The glass transition temperature (Tg) of the resin particles B is preferably lower than 0 degrees Celsius and more preferably −54) degrees Celsius or higher but lower than 0 degrees Celsius. The resin particles B having the Tg of lower than 0 degrees Celsius increases close adhesiveness between the clear ink and the underlying layer to increase scratch resistance of a coating film of the clear ink.

In terms of satisfying both of scratch resistance and close adhesiveness at the same time, a mass ratio MA:MB between the mass MA of the resin particles A and the mass MB of the resin particles B is preferably from 98:2 through 80:20. It is preferable that the resin particles A having Tg at 50 degrees Celsius or higher be contained in a greater amount. More preferably, the resin particles A are polyurethane resin particles.

The Tg of a dried film of the clear ink and the resin particles can be measured with, for example, differential scanning calorimeters (TA-60WS and DSC-60, available from Shimadzu Corporation).

—Polyurethane Resin—

When a polyurethane resin is added in the clear ink, an ink coating film formed with the clear ink has stiffness. This makes it easier to suppress internal breakage of the coating film and consequent partial peeling of the coating film, or change of the surface condition of the coating film and consequent change of the hue of a rubbed portion.

Examples of the polyurethane resin include, but are not limited to, polyether-based polyurethane resins, polycarbonate-based polyurethane resins, and polyester-based polyurethane resins.

The polyurethane resin is not particularly limited and may be appropriately selected depending on the intended purpose. Examples of the polyurethane resin include, but are not limited to, polyurethane resins obtained by allowing polyol to undergo reaction with polyisocyanate.

—Polyol—

Examples of the polyol include, but are not limited to, polyether polyol, polycarbonate polyol, and polyester polyol. These polyols may be used alone or in combination.

—Polyether Polyol—

Examples of the polyether polyol include, but are not limited to, a product obtained by allowing alkylene oxide to undergo addition polymerization with a starting material, which is at least one selected from compounds containing two or more active hydrogen atoms.

Examples of the compounds containing two or more active hydrogen atoms include, but are not limited to, ethylene glycol, diethylene glycol, triethylene glycol, propylene glycol, trimethylene glycol, 1,3-butanediol, 1,4-butanediol, 1,6-hexanediol, glycerin, trimethylolethane, and trimethylolpropane. These compounds may be used alone or in combination.

Examples of the alkylene oxide include, but are not limited to, ethylene oxide, propylene oxide, butylene oxide, styrene oxide, epichlorohydrin, and tetrahydrofuran. These alkylene oxides may be used alone or in combination.

The polyether polyol is not particularly limited and may be appropriately selected depending on the intended purpose. Polyoxytetramethylene glycol and polyoxypropylene glycol are preferable in terms of obtaining a binder for an ink capable of imparting an exceptional scratch resistance. These polyether polyols may be used alone or in combination.

—Polycarbonate Polyol—

Examples of the polycarbonate polyol that can be used for producing the polyurethane resin include, but are not limited to, products obtained by allowing carbonic acid ester to undergo reaction with polyol, and products obtained by allowing phosgene to undergo reaction with, for example, bisphenol A. These polycarbonate polyols may be used alone or in combination.

Examples of the carbonic acid ester include, but are not limited to, methyl carbonate, dimethyl carbonate, ethyl carbonate, diethyl carbonate, cyclocarbonate, and diphenyl carbonate. These carbonic acid esters may be used alone or in combination.

Examples of the polyol include, but are not limited to: dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcin, bisphenol A, bisphenol-F, and 4,4'-biphenol; and polyether polyols such as polyethylene glycol, polypropylene glycol, and polyoxytetramethylene glycol: and polyester polyols such as polyhexamethylene adipate, polyhexamethylene succinate, and polycaprolactone. These polyols may be used alone or in combination.

—Polyester Polyol—

Examples of the polyester polyol include, but are not limited to, products obtained by allowing polyol having a low molecular weight to undergo esterification reaction with polycarboxylic acid, polyesters obtained by allowing a cyclic ester compound such as ε-caprolactone to undergo ring-opening polymerization reaction, and copolyester of these polyesters. These polyester polyols may be used alone or in combination.

Examples of the polyol having a low molecular weight include, but are not limited to, ethylene glycol and propylene glycol. These polyols may be used alone or in combination.

Examples of the polycarboxylic acid include, but are not limited to, succinic acid, adipic acid, sebacic acid, dodecanedicarboxylic acid, terephthalic acid, isophthalic acid, phthalic acid, and anhydrides or ester-forming derivatives of these polycarboxylic acids. These polycarboxylic acids may be used alone or in combination.

—Polyisocyanate—

Examples of the polyisocyanate include, but are not limited to: aromatic diisocyanates such as phenylene diisocyanate, tolylene diisocyanate, diphenylmethane diisocyanate, and naphthalene diisocyanate; aliphatic or alicyclic diisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, 2,2,4-trimethylhexamethylene diisocyanate. These polyisocyanates may be used alone or in combination. Of these polyisocyanates, alicyclic diisocyanates are preferable in terms of weather resistance.

Additional use of at least one kind of an alicyclic diisocyanate makes it easier to obtain an intended coating film strength and an intended scratch resistance.

Examples of the alicyclic diisocyanate include, but are not limited to, isophorone diisocyanate and dicyclohexylmethane diisocyanate.

The proportion of the alicyclic diisocyanate is preferably 60% by mass or greater relative to the total amount of the isocyanate compound.

[Method for Producing Polyurethane Resin]

The method for producing the polyurethane resin is not particularly limited. The polyurethane resin can be obtained by producing methods that have been hitherto commonly used. Examples of the producing method include, but are not limited to, the following methods.

First, in the absence of a solvent or in the presence of an organic solvent, the polyol and the polyisocyanate are allowed to undergo reaction at an equivalent ratio at which isocyanate groups will be excessive, to produce an isocyanate-terminated urethane prepolymer.

Next, anionic groups in the isocyanate-terminated urethane prepolymer are neutralized with a neutralizer as needed, and subsequently allowed to undergo reaction with a chain extender. Finally, the organic solvent in the system is removed as needed. In this way, the polyurethane resin can be obtained.

Examples of the organic solvent that can be used for producing the polyurethane resin include, but are not limited to: ketones such as acetone, and methyl ethyl ketone; ethers such as tetrahydrofuran, and dioxane; acetic acid esters such as ethyl acetate and butyl acetate; nitriles such as acetonitrile; and amides such as dimethylformamide, N-methyl pyrrolidone, and N-ethyl pyrrolidone. These organic solvents may be used alone or in combination.

Examples of the chain extender include, but are not limited to polyamines and other active hydrogen group-containing compounds.

Examples of the polyamine include, but are not limited to: diamines such as ethylene diamine, 1,2-propane diamine, 1,6-hexamethylene diamine, piperazine, 2,5-dimethyl piperazine, isophorone diamine, 4,4'-dicyclohexylmethane diamine, and 1,4-cyclohexane diamine; polyamines such as diethylene triamine, dipropylene triamine, and triethylene tetramine; hydrazines such as hydrazine, N,N'-dimethyl hydrazine, and 1,6-hexamethylene bishydrazine; dihydrazides such as succinic acid dihydrazide, adipic acid dihydrazide, glutaric acid dihydrazide, sebacic acid dihydrazide, and isophthalic acid dihydrazide. These polyamines may be used alone or in combination.

Examples of the other active hydrogen group-containing compounds include, but are not limited to: glycols such as ethylene glycol, diethylene glycol, triethylene glycol, propylene glycol, 1,3-propanediol, 1,3-butanediol 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A and hydroquinone; and water. These other active hydrogen group-containing compounds may be used alone or in combination as long as storage stability of the ink is not degraded.

Polycarbonate-based polyurethane resins are preferable as the polyurethane resin in terms of water resistance, heat resistance, wear resistance, weather resistance, and image scratch resistance based on a high cohesive force of carbonate groups. With the polycarbonate-based polyurethane resins, an ink suitable for printed matters to be used under severe conditions such as outdoors can be obtained.

A commercially available product may be used as the polyurethane resin. Examples of the commercially available product include, but are not limited to, UCOAT UX-485

(polycarbonate-based polyurethane resin), UCOAT UWS-145 (polyester-based polyurethane resin), PERMARINE UA-368T (polycarbonate-based polyurethane resin), and PERMARINE UA-200 (polyether-based polyurethane resin) (all available from Sanyo Chemical Industries, Ltd.). These commercially available products may be used alone or in combination.

A total proportion of the resin particles contained in the clear ink is preferably 10% by mass or greater, and in terms of excellent scratch resistance and excellent ink discharging stability, more preferably 10% by mass or greater but 25% by mass or less. When the total proportion of the resin particles is 10% by mass or greater, scratch resistance is better improved.

<Water>

The water is not particularly limited and may be appropriately selected depending on the intended purpose. Examples of the water include, but are not limited to, pure water such as ion-exchanged water, ultrafiltrated water, reverse osmotic water, and distilled water, and ultrapure water. These kinds of water may be used alone or in combination.

The proportion of the water in the clear ink is preferably 15% by mass or greater but 60% by mass or less. When the proportion of the water is 15% by mass or greater, thickening to a high viscosity can be prevented and discharging stability can be improved. On the other hand, when the proportion of the water is 60% by mass or less, a good wettability over impermeable print media can be obtained and image quality can be improved.

<Compound Represented by General Formula (1)>

The clear ink contains a compound represented by General Formula (1) below.

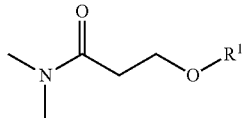

General Formula (1)

In the General Formula (1), $R^1$ represents an alkyl group having 1 or more but 4 or less carbon atoms.

In the General Formula (1), when $R^1$ is an alkyl group having 1 or more but 4 or less carbon atoms, a coating film having excellent scratch resistance and being prevented from poor drying to have excellent blocking resistance can be formed.

Inclusion of the compound represented by the General Formula (1) can increase drying property of an aqueous clear ink to prevent occurrence of blocking. Although it is more advantageous to thicken a clear ink coating film in order to achieve high scratch resistance, a large deposition amount of a clear ink leads to poor drying property, causing abnormal images with, for example, traces of blocking. Inclusion of the compound represented by the General Formula (1) can prevent poor drying property leading to formation of abnormal images with, for example, traces of blocking, even when the deposition amount of the clear ink is large.

The amount of the compound represented by the General Formula (1) is not particularly limited and may be appropriately selected depending on the intended purpose. In terms of being able to obtain the effect of increasing drying property, the proportion thereof in the clear ink is preferably 4% by mass or more. In terms of further increasing drying property and storage stability of the aqueous clear ink, the proportion thereof in the clear ink is more preferably 4% by mass or more but 90% by mass or less.

Examples of $R^1$ in the compound represented by the General Formula (1) include, but are not limited to, a methyl group, an ethyl group, a propyl group, and a n-butyl group. In particular, 3-methoxy-N,N-dimethylpropionamide where the $R^1$ is a methyl group is preferable.

The compound represented by the General Formula (1) may be an appropriately synthesized product or a commercially available product. Examples of the commercially available product include, but are not limited to, EQUAMIDE M100 (obtained from Idemitsu Kosan Co., Ltd.) where the $R^1$ is a methyl group and EQUAMIDE B100 (obtained from Idemitsu Kosan Co., Ltd.) where the $R^1$ is a n-butyl group.

<Surfactant>

It is preferable that the clear ink contain a surfactant.

When a surfactant is added in the ink, the surface tension of the ink is reduced, and the ink permeates print media such as paper quickly after ink droplets land on the print media. Therefore, feathering and color bleed can be reduced.

Surfactants are classified into nonionic, anionic, and amphoteric surfactants depending on the polarity of the hydrophilic group.

Surfactants are classified into fluorine-based, silicone-based, and acetylene-based surfactants depending on the structure of the hydrophobic group.

In the present disclosure, fluorine-based surfactants are mainly used. However, silicone-based surfactants and acetylene-based surfactants may be used in combination.

As the surfactant, any of silicone-based surfactants, fluorine-based surfactants, amphoteric surfactants, nonionic surfactants, and anionic surfactants may be used.

The silicone-based surfactant has no specific limit and can be suitably selected to suit to a particular application. Of these silicone-based surfactants, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, Nia, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market are suitable. Examples of the product available on the market include, but are not limited to, those obtained from Byk Chemie Japan Co., Ltd., Shin-Etsu Chemical Co., Ltd., Dow Corning Toray Silicone Co., Ltd., NIHON EMULSION Co., Ltd., and Kyoeisha Chemical Co., Ltd.

The polyether-modified silicone-based surfactant has no particular limit and can be suitably selected to suit to a particular application. Examples thereof include, but are not limited to, a compound in which the polyalkylene oxide structure represented by the following General formula (S-1) is introduced into the side chain of the Si site of dimethyl polysiloxane.

[General Formula (S-1)]

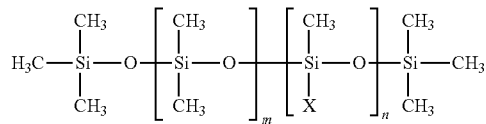

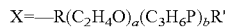

In General formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440. TSF4452, and TSF4453 (all manufactured by Toshiba Silicone Co., Ltd.).

A fluorosurfactant in which the number of carbon atoms replaced with fluorine atoms is from 2 to 16 and more preferably from 4 to 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these fluorosurfactants, polyoxyalkylene ether polymer compounds having a perfluoroalkyl ether group in its side chain are preferable because these compounds do not foam easily and the fluorosurfactant represented by the following General formula F-1 or General formula F-2 is particularly preferable.

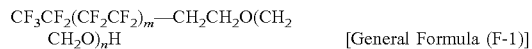
[General Formula (F-1)]

In the General formula (F-1), "m" is preferably 0 or an integer of from 1 to 10 and "n" is preferably 0 or an integer of from 1 to 40 in order to provide water solubility.

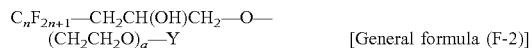
[General formula (F-2)]

In the General formula F-2, Y represents H, $C_mF_{2m+1}$, where "m" is an integer of from 1 to 6, $CH_2CH(OH)CH_2\text{-}C_mF_{2m+1}$, where m represents an integer of from 4 to 6, or $C_pH_{2p+1}$, where p represents an integer of from 1 to 19. "n" represents an integer of from 1 to 6. "a" represents an integer of from 4 to 14.

Products available on the market may be used as the fluorosurfactant.

Specific examples of the products available on the market include, but are not limited to, SURFLON S-111, S-112, S-113, S-121, S-131, S-132, S-141, and S-145 (all available from ASAHI GLASS CO., LTD.); FLUORAD FC-93, FC-95, FC-98, FC-129, FC-135, FC-170C, FC-430, and FC-431 (all available from SUMITOMO 3M); MEGAFAC F-470, F-1405, and F-474 (all available from DIC Corporation); ZONYL TBS, FSP, FSA, FSN-100, FSN, FSO-100, FSO, FS-300, and UR, and CAPSTONE (registered trademark) FS-30, FS-31, PS-3100, FS-34, and FS-35 (all available from the Chemours Company); FT-110, FT-250, FT-251, FT-400S, FT-150, and FT-400SW (all available from NEOS COMPANY LIMITED), POLYFOX PF-136A, PF-156A, PF-151N, PF-154, and PF-159 (available from OMNOVA SOLUTIONS INC.), and UNIDYNE DSN-403N (available from DAIKIN INDUSTRIES). Of these products, FS-3100, FS-34, and FS-300 available from the Chemours Company, FT-110, FT-250, FT-251, FT-400S, FT-150, and FT-400SW all available from NEOS COMPANY LIMITED, POLYFOX PF-151N available from OMNOVA SOLUTIONS INC., and UNIDYNE DSN-403N available from DAIKIN INDUSTRIES are particularly preferable in terms of good printing quality, coloring in particular, and improvement on permeation, wettability, and uniform dyeing property to paper.

<Organic Solvent>

The clear ink may contain an organic solvent. The organic solvent is not particularly limited and may be appropriately selected depending on the intended purpose. Examples of the organic solvent include, but are not limited to, water-soluble organic solvents. Water solubility means, for example, solubility of 5 g or greater in 10 g of water at 25 degrees Celsius.

Examples of the water-soluble organic solvent include, but are not limited to: polyvalent alcohols such as ethylene glycol, diethylene glycol, 1,2-propanediol, 1,3-propanediol, 1,2-butanediol, 1,3-butanediol, 2,3-butanediol, 3-methyl-1,3-butanediol, 3-methoxy-3-methyl butanol, triethylene glycol, polyethylene glycol, polypropylene glycol, 1,5-pentanediol, 2-methyl-2,4-pentanediol, 1,6-hexanediol, glycerin, 1,2,6-hexanetriol, 2-ethyl-1,3-hexanediol, ethyl 1,2,4-butanetriol, 1,2,3-butanetriol, and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and dipropylene glycol monomethyl ether; polyvalent alcohol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methyl formamide, and N,N-dimethyl formamide; amines such as monoethanol amine, diethanol amine, and triethyl amine; sulfur-containing compounds such as dimethyl sulfoxide, sulfolane, and thiodiethanol; and propylene carbonate, and ethylene carbonate. These water-soluble organic solvents may be used alone or in combination.

The proportion of the organic solvent in the clear ink is not particularly limited, may be appropriately selected depending on the intended purpose, and is preferably 10% by mass or greater but 60% by mass or less and more preferably 20% by mass or greater but 60% by mass or less in terms of drying property and discharging reliability of the ink.

The clear ink may contain a defoaming agent, a preservative and fungicide, a corrosion inhibitor, and a pH regulator as other components as needed.

—Defoaming Agent—

The defoaming agent has no particular limit. For example, silicone-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

—Preservative and Fungicide—

The preservatives and fungicides are not particularly limited. A specific example is 1,2-benzisothiazolin-3-on.

—Corrosion Inhibitor—

The corrosion inhibitor has no particular limit. Examples thereof are acid sulfite and sodium thiosulfate.

—pH Regulator—

The pH regulator has no particular limit. It is preferable to adjust the pH to 7 or higher. Specific examples thereof include, but are not limited to, amines such as diethanol amine and triethanol amine.

The property of the clear ink is not particularly limited and can be suitably selected to suit to a particular application. For example, viscosity, surface tension. pH, etc., are preferably in the following ranges.

The viscosity of the clear ink at 25 degrees Celsius is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:
Standard cone rotor (1° 34'×R24)
Sample liquid amount: 1.2 mL
Number of rotations: 50 rotations per minute (rpm)
−25 degrees C.
Measuring time: three minutes The surface tension of the clear ink is preferably 35 mN/m or less and more preferably 32 mN/n or less at 25 degrees Celsius in terms that the clear ink is suitably levelized on a print medium and the drying time of the clear ink is shortened.

The pH of the clear ink is preferably from 7 to 12 and more preferably from 8 to 11 in terms of prevention of corrosion of metal materials contacting the ink.

<Print Target>

A print target is not limited to articles used as typical print media. It is suitable to use building materials such as wall paper, floor material, and tiles, cloth for apparel such as T-shirts, textile, and leather as the print medium. In addition, the configuration of the paths through which the print medium is transferred can be adjusted to accommodate ceramics, glass, metal, etc. as the print target.

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of vinyl chloride resin, polyethylene terephthalate (PET), acrylic resins, polypropylene, polyethylene, and polycarbonate are suitably used for the non-permeating substrate.

(Printing Method and Inkjet Printing Apparatus)

A printing method of the present disclosure is a printing method including a step of applying an ink containing a colorant and a step of applying a clear ink. As the clear ink, the clear ink of the present disclosure is used. The printing method of the present disclosure is not particularly limited as long as the printing method is a method for forming a clear ink layer over a color image.

In the printing method of the present disclosure, the step of applying an ink containing a colorant and a step of applying a clear ink may be performed with the same printing apparatus or may be performed with different printing apparatuses.

In the step of applying a clear ink, the amount of the clear ink to be deposited to the print target surface is preferably 15 g/m- or more per unit area. When the amount thereof to be deposited is 15 g/m$^2$ or more, the resultant clear ink coating layer becomes thicker, and a thick protection layer can be formed to achieve high scratch resistance.

In the step of applying a clear ink, the temperature of the print target may be controlled before, during, and/or after printing. Properly controlling the temperature of the print target can promote drying of the ink and control the formation of a uniform coating film.

The temperature of the print target surface during the printing is not particularly limited and may be appropriately selected depending on the intended purpose. The temperature of the print target is preferably 50 degrees Celsius or lower. When the temperature of the print target surface during the printing is 50 degrees Celsius or lower, the clear ink is stably discharged by the inkjet method.

An example of a case where the printing method of the present disclosure is performed by an inkjet printing apparatus will be described.

In the following description of the printing apparatus and the printing method, a case of using a black (K) ink, a cyan (C) ink, a magenta (M) ink, and a yellow (Y) ink will be described. Instead, or in addition, a clear ink may be used.

The clear ink of the present disclosure can be suitably applied to various printing apparatuses employing an inkjet printing method such as printers, facsimile machines, photocopiers, multifunction peripherals (serving as a printer, a facsimile machine, and a photocopier), and 3D model manufacturing devices (3D printers, additive manufacturing device).

The printing apparatus and the printing method represent a device capable of discharging ink, various processing fluids, etc. to a print medium and a method printing an image on the print medium using the device. The print medium means an article to which the ink or the various processing fluids can be attached at least temporarily.

The printing apparatus encompasses an inkjet printing apparatus of the present disclosure. The inkjet printing apparatus is an inkjet printing apparatus including a discharging unit configured to discharge an ink. The inkjet printing apparatus includes the clear ink of the present disclosure.

The inkjet printing apparatus includes both a serial type device in which the liquid discharging head is caused to move and a line type device in which the liquid discharging head is not moved, unless otherwise specified.

Furthermore, in addition to the desktop type, this inkjet printing apparatus includes a wide type, a continuous printer capable of using continuous paper wound up in a roll form as print media.

The printing apparatus may further optionally include a device relating to feeding, conveying, and ejecting the print medium and other devices referred to as a pre-processing device, a post-processing device, etc. in addition to the head portion to discharge the ink.

In addition, the printing apparatus and the printing method are not limited to those producing merely meaningful visible images such as texts and figures with the ink. For example, the printing apparatus and the printing method can produce patterns like geometric design and 3D images.

The printing apparatus includes both a serial type device in which the liquid discharging head is caused to move and a line type device in which the liquid discharging head is not moved, unless otherwise specified.

Furthermore, in addition to the desktop type, this printing apparatus includes a wide type capable of printing images on a large print medium such as A0, a continuous printer capable of using continuous paper wound up in a roll form as print media.

Figure 2:
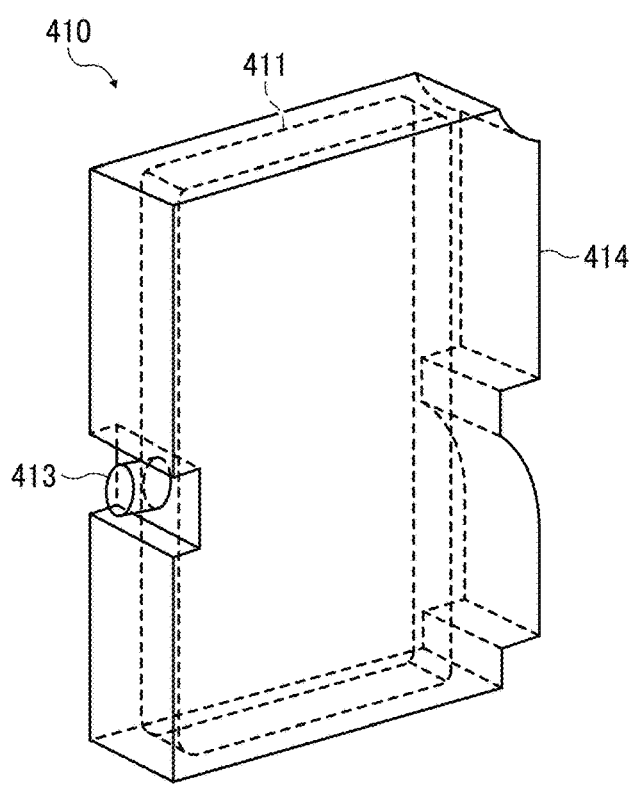
FIG. 2 is a schematic perspective view of a main tank of the present disclosure.

The printing apparatus of the present disclosure is described using an example with reference to FIG. 1 and FIG. 2. FIG. 1 is a perspective view of the printing apparatus. FIG. 2 is a perspective view of the main tank. An image forming apparatus 400 as an example of the printing apparatus is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing apparatus may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

Figure 3:
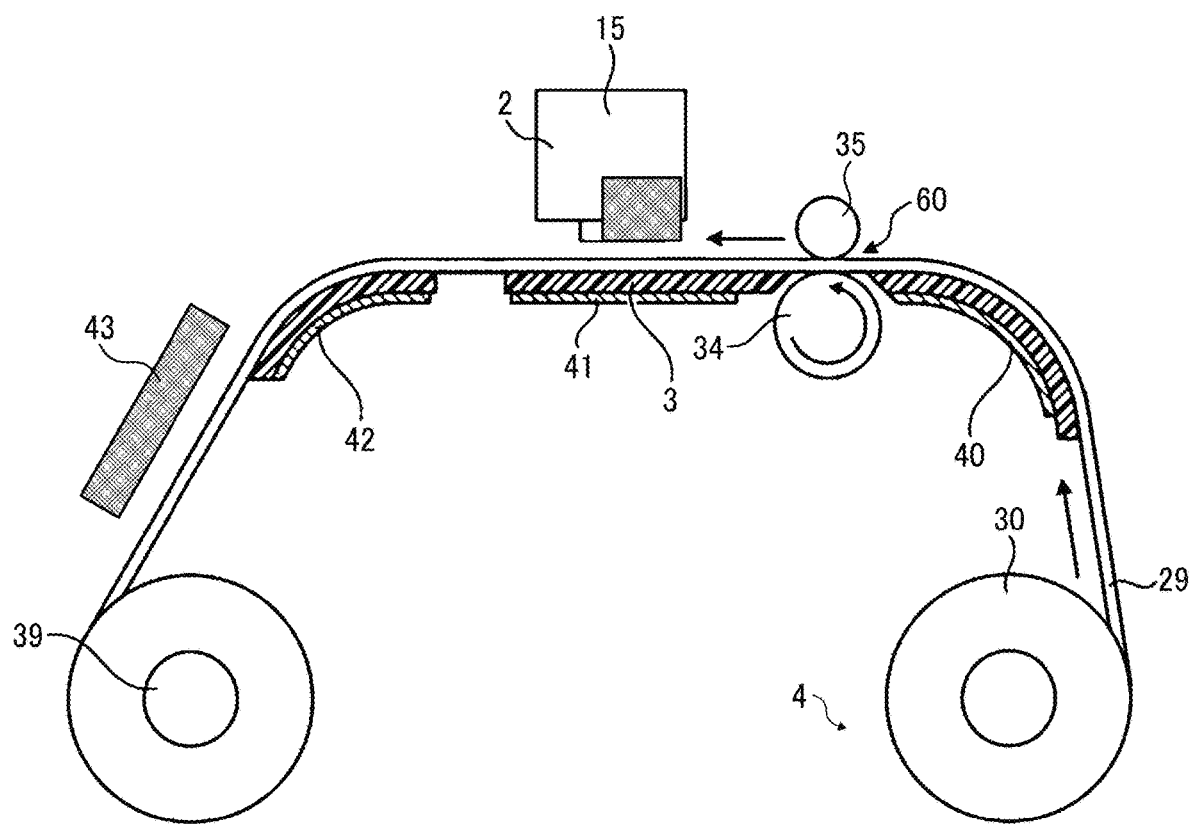
FIG. 3 is a schematic diagram illustrating the interior of an inkjet printing apparatus of the present disclosure.

FIG. 3 illustrates the interior of an inkjet printing apparatus, in which a print head 2, a platen 3, a roll media accommodating section 4, a heating unit, etc. are arranged.

A carriage 15 includes a clear ink and if necessary color inks of black (K), yellow (Y), magenta (M), and cyan (C). The carriage 15 also includes the print head 2, which is a discharging unit configured to discharge ink droplets. The inks included in the carriage 15 may be combinations of the color inks and the clear ink or may all be the clear ink.

The roll media accommodating section 4 is a sheet feeding unit and includes a roll medium (print medium) 30 that is a print target.

A conveying unit 60 includes a feed roller 34 and a press roller 35 that are located in the vertical direction to face each other via the platen 3. The feed roller 34 and the press roller 35 sandwich a print target (print medium) 29 therebetween. When the feed roller 34 is rotated forward (the arrow direction in FIG. 3), the print medium 29, which has been fed onto the platen 3, can be conveyed forward on the platen 3.

The inkjet printing apparatus is provided with: a pre-heater 40 located upstream the platen 3 in the print medium conveying direction and configured to preliminarily heat the print medium 29 (heating before printing); and a print heater 41 as a heating unit configured to perform heating when the clear ink is deposited to the print target from the nozzle of the print head (heating during printing).

Downstream the print head 2, a post-heater 42 may be provided downstream the platen 3 (heating after printing). It is preferable to provide the post-heater 42 because the print medium 29 can be heated again to promote drying of the ink droplets that have landed thereon.

The pre-heater 40, the print heater 41, and the post-heater 42 for use are, for example, conductive heaters using ceramics and nichrome wires. Other heating units such as a hot air heating unit may be used.

Downstream the start point of the post-heater 42, an additional heating unit may be provided, such as a hot air fan 43 configured to blow hot air to the printing surface of the print medium 29 on which the ink has landed. After the ink has been completely dried by directly blowing hot air to the ink on the printing surface with the hot air fan, the print medium 29 can be wound up with a winding-up roller 39.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable as a product of molding performed after surface-decoration. Examples thereof are gauges or operation panels of vehicles, office machines, electric and electronic machines, cameras, etc.

EXAMPLES

The present disclosure will be described below by way of Examples. The present disclosure should not be construed as being limited to these Examples. Unless otherwise described, preparation and evaluation were performed at room temperature of 25 degrees Celsius at a humidity of 60% RH.

Preparation Example 1

<Preparation of Resin Emulsion 1>
—Polycarbonate-Based Polyurethane Resin—

A reactor into which a stirrer, a reflux condenser, and a thermometer were inserted was charged with polycarbonate diol (a reaction product of 1,6-hexanediol and dimethyl carbonate, with a number average molecular weight (Mn) of 1,200) (1,500 parts by mass), 2,2-dimethylolpropinonic acid (hereinafter may be referred to as "DMPA") (300 parts by mass), and N-methyl pyrrolidone (hereinafter may be referred to as "NMP") (1,420 parts by mass) under a nitrogen stream. The materials were heated to 60 degrees Celsius to dissolve DMPA.

Next, 4,4'-dicyclohexylmethane diisocyanate (1,824 parts by mass) and dibutyl tin dilaurate (catalyst) (2.6 parts by mass) were added to the resultant and heated to 90 degrees Celsius, to allow the materials to undergo a urethanation reaction for five hours, to obtain an isocyanate-terminated urethane prepolymer. This reaction product was cooled to 80 degrees Celsius. To the resultant, triethylamine (260 parts by mass) was added and mixed. From the resultant, 4,340 parts by mass was extracted and added in a mixture solution of water (5,400 parts by mass) and triethylamine (15 parts by mass) under strong stirring.

Next, ice (1,500 parts by mass) was added to the resultant, and a 35% by mass 2-methyl-1,5-pentanediamine aqueous solution (830 parts by mass) was added to the resultant to allow the materials to undergo a chain elongation reaction. The solvent was evaporated from the resultant to adjust the solid component concentration to 30% by mass, to obtain a resin emulsion 1.

The glass transition temperature (Tg) of the obtained resin emulsion 1 measured according to <Method for measuring glass transition temperature of resin emulsion> described below was 55 degrees Celsius. The volume average particle diameter of the resin emulsion 1 measured with a particle size analyzer (NANOTRAC WAVE II, obtained from MicrotracBEL Corporation) was 44 nm.

<Method for Measuring Glass Transition Temperature of Resin Emulsion>

The glass transition temperature of the resin emulsion was measured with differential scanning calorimeters (TA-60WS and DSC-60, obtained from Shimadzu Corporation).

The resin emulsion (4 g) was poured into a petri dish having a diameter of 50 mm and formed of a tetrafluoroethylene/perfluoroalkyl vinyl ether copolymer (PFA) in a manner that the resin emulsion would spread uniformly. The resin emulsion was dried at 50 degrees Celsius for one week, to obtain a resin film. Five point zero milligrams of the resin film was put in a sample container formed of aluminum, and the sample container was put on a holder unit and set in an electric furnace. Next, under a nitrogen atmosphere, the sample was subjected to temperature elevation from 0 degrees Celsius to 150 degrees Celsius at a temperature elevation rate of 10 degrees C./min, then to temperature reduction from 150 degrees Celsius to −80 degrees Celsius at a temperature reduction rate of 5 degrees C./min, and then further to temperature elevation to 150 degrees Celsius at a temperature elevation rate of 10 degrees C./min, to measure a DSC curve. With an analyzing program of the DSC-60 system, the obtained DSC curve was analyzed by a midpoint method based on the inflection point in the second temperature elevation, to obtain a glass transition temperature (Tg).

Preparation Example 2

<Preparation of Resin Emulsion 2>
—Polyester-Based Polyurethane Resin—

A reaction vessel having a capacity of 2 L and equipped with a stirrer, a thermometer, a nitrogen-sealed tube, and a cooler was charged with methyl ethyl ketone (100 parts by mass), polyester polyol obtained from polyester polyol (1) (iPA/AA=6/4 (ratio by mole)) and EG/NPG=1/9 (ratio by mole) (with a number average molecular weight: 2,000, and an average number of functional groups: 2, iPA: isophthalic acid, AA: adipic acid, EG: ethylene glycol, and NPG: neopentyl glycol) (345 parts by mass), and 2,2-dimethylolpropionic acid (DMPA) (9.92 parts by mass). The materials were mixed uniformly at 60 degrees Celsius.

Subsequently, triethylene glycol diisocyanate (TEGDI) (40.5 parts by mass) and dioctyl tin dilaurate (DOTDL) (0.08 pars by mass) were added to the resultant, and allowed to undergo reaction at 72 degrees Celsius for three hours, to obtain a polyurethane solution.

IPA (80 parts by mass), MEK (220 parts by mass), triethanolamine (TEA) (3.74 parts by mass), and water (596 parts by mass) were added to the polyurethane solution to change the phase of the polyurethane solution. Subsequently, MEK and IPA were removed from the resultant with a rotary evaporator, to obtain a resin emulsion 2.

After the obtained aqueous emulsion was cooled to normal temperature, ion-exchanged water and a sodium hydroxide aqueous solution were added to the resultant to adjust the solid component concentration to 30% by mass and pH to 8.

The glass transition temperature (Tg) of the prepared resin emulsion 2 measured in the same manner as the resin emulsion 1 was −4 degrees Celsius.

The volume average particle diameter of the prepared resin emulsion 2 measured in the same manner as the resin emulsion 1 was 105 nm.

Preparation Example 3

<Preparation of Resin Emulsion 3>
—Polycarbonate-Based Polyurethane Resin—

A reaction vessel into which a stirrer, a retlux condenser, and a thermometer were inserted was charged with polycarbonate diol (a reaction product of 1,6-hexanediol and dimethyl carbonate, with a number average molecular weight (Mn): 1,000) (1,500 parts by mass), 2,2-dimethylolpropionic acid (hereinafter may be referred to as "DMPA") (260 parts by mass), and N-methyl pyrrolidone (hereinafter may be referred to as "NMP") (1,320 parts by mass) under a nitrogen stream. The materials were heated to 60 degrees Celsius to dissolve DMPA.

Next, 4,4'-dicyclohexylmethane diisocyanate (1,530 parts by mass) and dibutyl tin laurate (catalyst) (2.6 parts by mass) were added to the resultant and heated to 90 degrees Celsius, to allow the materials to undergo a urethanation reaction for five hours, to obtain an isocyanate-terminated urethane prepolymer. This reaction mixture was cooled to 80 degrees Celsius. Triethylamine (245 parts by mass) was added and mixed in the resultant. From the resultant, 4,340 parts by mass was extracted and added in a mixture solution of water (5,400 parts by mass) and triethylamine (15 parts by mass) under strong stirring.

Next, ice (1,500 parts by mass) was added to the resultant, and a 35% by mass 2-methyl-1,5-pentanediamine aqueous solution (793 parts by mass) was added to the resultant, to allow the materials to undergo a chain elongation reaction. The solvent was evaporated from the resultant to adjust the solid component concentration to 30% by mass, to obtain a resin emulsion 3.

The glass transition temperature (Tg) of the obtained resin emulsion 3 measured in the same manner as the resin emulsion 1 was 45 degrees Celsius. The volume average particle diameter of the resin emulsion 3 measured in the same manner as the resin emulsion 1 was 40 nm.

Preparation Example 4

<Preparation of Resin Emulsion 4>
—Polycarbonate-Based Polyurethane Resin—

A reaction vessel into which a stirrer, a reflux condenser, and a thermometer were inserted was charged with polycarbonate diol (a reaction product of 1,6-hexanediol and dimethyl carbonate, with a number average molecular weight (Mn) of 1,200) (1,500 parts by mass), 2,2-dimethylolpropionic acid (hereinafter may be referred to as "DMPA") (350 parts by mass), and N-methyl pyrrolidone (hereinafter may be referred to as "NMP") (2,300 parts by mass) under a nitrogen stream. The materials were heated to 60 degrees Celsius to dissolve DMPA.

Next, 4,4'-dicyclohexylmethane diisocyanate (2,100 parts by mass) and dibutyl tin dilaurate (catalyst) (2.6 parts by mass) were added to the resultant and heated to 90 degrees Celsius, to allow the materials to undergo a urethanation reaction for five hours, to obtain an isocyanate-terminated urethane prepolymer. This reaction mixture was cooled to 80 degrees Celsius. Triethylamine (270 parts by mass) was added and mixed in the resultant. From the resultant, 4,340 parts by mass was extracted and added in a mixture solution of water (5,400 parts by mass) and triethylamine (15 parts by mass) under strong stirring.

Next, ice (1,500 parts by mass) was added to the resultant, and a 35% by mass 2-methyl-1,5-pentanediamine aqueous solution (800 parts by mass) was added to the resultant, to allow the materials to undergo a chain elongation reaction. The solvent was evaporated from the resultant to adjust the solid component concentration to 30% by mass, to obtain a resin emulsion 4.

The glass transition temperature (Tg) of the obtained resin emulsion 4 measured in the same manner as the resin emulsion 1 was 56 degrees Celsius. The volume average particle diameter of the resin emulsion 4 measured in the same manner as the resin emulsion 1 was 57 nm.

Production Example 1

—Production of Clear Ink A—

The resin emulsion 1 of Preparation Example 1 (with a solid component concentration of 30% by mass) (29.6% by mass), the resin emulsion 2 of Preparation Example 2 (with a solid component concentration of 30% by mass) (0.4% by mass), 1,2-propanediol (13% by mass), 1,3-propanediol (10.5% by mass), 1,2-butanediol (3% by mass), EQUAMIDE M100 (obtained from Idemitsu Kosan Co., Ltd., a compound represented by General Formula (1) where $R^1$ is a methyl group) (3.5% by mass), a surfactant "FS-300" (product name) (obtained from Du Pont K. K., a flurosurfactant, with a solid component concentration of 40% by mass) (6% by mass), and highly pure water (34% by mass) were added together and mixed and stirred, to prepare a mixture.

Next, the obtained mixture was filtrated through a polypropylene filter having an average pore diameter of 0.2 micrometers (product name: BETAFINE POLYPROPYLENE PLEATED FILTER PPG SERIES, obtained from 3M Limited), to produce clear ink A.

Production Examples 2 to 10

—Production of Clear Inks B to M—

Clear inks B to M were produced in the same manner as in Production Example 1, except that unlike in Production Example 1, the ink composition was changed to as presented in Table 1-1 and Table 2-1.

The glass transition temperature (Tg) of dried films of the clear inks A to M was measured according to <Method for measuring glass transition temperature of dried film of clear ink> described below. The volume average particle diameter of the clear inks was measured in the same manner as the resin emulsion 1.

The resin solid component concentration (% by mass) in the clear inks, and a mass ratio MA:MB between the mass MA of resin particles A having Tg of 50 degrees Celsius or higher and the mass MB of resin particles B having Tg of lower than 0 degrees Celsius in the clear inks are presented in Table 1-2 and Table 2-2 with the measurements of Tg of each ink and the measurements of the volume average particle diameter of each clear ink.

<Method for Measuring Glass Transition Temperature of Dried Film of Clear Ink>

The glass transition temperature of a dried film of a clear ink was measured with differential scanning calorimeters (TA-60WS and DSC-60, obtained from Shimadzu Corporation).

The clear ink (4 g) was poured into a petri dish having a diameter of 50 mm and formed of a tetrafluoroethylene/perfluoroalkyl vinyl ether copolymer (PFA) in a manner that the clear ink would spread uniformly. The clear ink was dried at 50 degrees Celsius for one week, to obtain an ink film. Five point zero milligrams of the ink film was put in a sample container formed of aluminum, and the sample container was put on a holder unit and set in an electric furnace. Next, under a nitrogen atmosphere, the sample was subjected to temperature elevation from 0 degrees Celsius to 150 degrees Celsius at a temperature elevation rate of 10 degrees C./min, then to temperature reduction from 150 degrees Celsius to −80 degrees Celsius at a temperature reduction rate of 5 degrees C./min, and then further to temperature elevation to 150 degrees Celsius at a temperature elevation rate of 10 degrees C./min, to measure a DSC curve. With an analyzing program of the DSC-60 system, the obtained DSC curve was analyzed by a mid-point method based on the inflection point in the second temperature elevation, to obtain a glass transition temperature (Tg).

TABLE 1-1

| | | Production Ex. 1 Clear ink A | Production Ex. 2 Clear ink B | Production Ex. 3 Clear ink C | Production Ex. 4 Clear ink D | Production Ex. 5 Clear ink E | Production Ex. 6 Clear ink F | Production Ex. 7 Clear ink G |
|---|---|---|---|---|---|---|---|---|
| Resin | Resin emulsion 1 Polycarbonate-based urethane (water-dispersible, solid component concentration: 30% by mass, Tg 55° C., 44 nm) | 29.6 | 29 | 27 | 24.5 | 23 | 32 | 29 |
| | Resin emulsion 2 Polyester-based urethane (water-dispersible, solid component concentration: 30% by mass, Tg −4° C., 105 nm) | 0.4 | 1 | 3 | 5.5 | 7 | 2 | 1 |
| | Resin emulsion 3 Polycarbonate-based urethane (water-dispersible, solid component concentration: 30% by mass, Tg 45° C., 40 nm) | | | | | | | |
| | Resin emulsion 4 Polycarbonate-based urethane (water-dispersible, solid component concentration: 30% by mass, Tg 56° C., 57 nm) | | | | | | | |
| Water | High pure water | 34 | 34 | 33.5 | 32.5 | 31.5 | 31 | 35 |
| Surfactant | FS-300/DuPont (solid component concentration: 40% by mass) | 6 | 6 | 6 | 6 | 6 | 6 | 6 |
| Organic solvent | 1,2-propanediol | 13 | 13 | 13.5 | 14.5 | 15.5 | 12 | 12 |
| | 1,3-propanediol | 10.5 | 10.5 | 10.5 | 10.5 | 10.5 | 10.5 | 9.5 |
| | 1,2-butamediol | 3 | 3 | 3 | 3 | 3 | 3 | 3 |
| | EQUAMIDE M100 (Formula (1) where R1 is methyl) | 3.5 | 3.5 | 3.5 | 3.5 | 3.5 | 3.5 | 4.5 |
| | EQUAMIDE B100 (Formula (1) where R1 is butyl) | | | | | | | |
| Total (% by mass) | | 100 | 100 | 100 | 100 | 100 | 100 | 100 |

TABLE 1-2

| | Production Ex. 1 Clear ink A | Production Ex. 2 Clear ink B | Production Ex. 3 Clear ink C | Production Ex. 4 Clear ink D | Production Ex. 5 Clear ink E | Production Ex. 6 Clear ink F | Production Ex. 7 Clear ink G |
|---|---|---|---|---|---|---|---|
| Resin solid component concentration in the clear ink (% by mass) | 9 | 9 | 9 | 9 | 9 | 10.2 | 9 |
| Volume average particle diameter of particles in the clear ink (nm) | 44 | 45 | 46 | 47 | 49 | 46 | 45 |
| Mass ratio (MA:MB) between mass MA of resin particles A having Tg of 50° C. or higher and mass MB of resin particles B having Tg of lower than 0° C. | 99:1 | 97:3 | 90:10 | 82:18 | 77:23 | 94:6 | 97:3 |
| Tg (° C.) of clear ink coating film | 55° C., −4° C. | 55° C., −4° C. | 54° C., −3° C. | 54° C., −3° C. | 54° C., −3° C. | 54° C., −3° C. | 55° C., −4° C. |

TABLE 2-1

| | | Production Ex. 8 Clear ink H | Production Ex. 9 Clear ink I | Production Ex. 10 Clear ink J | Production Ex. 11 Clear ink K | Production Ex. 12 Clear ink L | Production Ex. 13 Clear ink M |
|---|---|---|---|---|---|---|---|
| Resin | Resin emulsion 1 Polycarbonate-based urethane (water-dispersible, solid component concentration: 30% by mass, Tg 55° C., 44 nm) | 29 | 29 | | 30 | | 29 |
| | Resin emulsion 2 Polyester-based urethane (water-dispersible, solid component concentration: 30% by mass, Tg −4° C., 105 nm) | 1 | 1 | 3 | | 3 | 1 |
| | Resin emulsion 3 Polycarbonate-based urethane (water-dispersible, solid component concentration: 30% by mass, Tg 45° C., 40 nm) | | | 27 | | | |
| | Resin emulsion 4 Polycarbonate-based urethane (water-dispersible, solid component concentration: 30% by mass, Tg 56° C., 57 nm) | | | | | 27 | |
| Water | High pure water | 36.5 | 39 | 31.5 | 34.5 | 33.5 | 33.5 |
| Surfactant | FS-300/DuPont (solid component concentration: 40% by mass) | 6 | 6 | 6 | 6 | 6 | 6 |
| Organic solvent | 1,2-propanediol | 9 | 2.5 | 15.5 | 12.5 | 13.5 | 16.5 |
| | 1,3-propanediol | 5.5 | 1.5 | 10.5 | 10.5 | 10.5 | 11 |
| | 1,2-butanediol | 3 | 1 | 3 | 3 | 3 | 3 |
| | EQUAMIDE M100 (Formula (1) where R1 is methyl) | | 20 | 3.5 | 3.5 | 3.5 | |
| | EQUAMIDE B100 (Formula (1) where R1 is butyl) | 10 | | | | | |
| Total (% by mass) | | 100 | 100 | 100 | 100 | 100 | 100 |

TABLE 2-2

| | Production Ex. 8 Clear ink H | Production Ex. 9 Clear ink I | Production Ex. 10 Clear ink J | Production Ex. 11 Clear ink K | Production Ex. 12 Clear ink L | Production Ex. 13 Clear ink M |
|---|---|---|---|---|---|---|
| Resin solid component concentration in the clear ink (% by mass) | 9 | 9 | 9 | 9 | 9 | 9 |
| Volume average particle diameter of particles in the clear ink (nm) | 45 | 45 | 41 | 44 | 56 | 45 |
| Mass ratio (MA:MB) between mass MA of resin particles A having Tg of 50° C. or higher and mass MB of resin particles B having Tg of lower than 0° C. | 97:3 | 97:3 | — | — | 90:10 | 97:3 |
| Tg (° C.) of clear ink coating film | 55° C., −4° C. | 53° C., −4° C. | 45° C., −3° C. | 55° C. | 55° C., −4° C. | 55° C., −4° C. |

Example 1

<Inkjet Printing>

The ink cartridge of wide format inkjet printer ProL5160 (obtained from Ricoh Company, Limited) was charged with clear ink A of Production Example 1. All of the cartridges of color inks mounted to the wide format inkjet printer ProL5160 were replaced with cartridges charged with the clear ink, to modify the wide format inkjet printer ProL5160 so that the clear ink could be discharged. The modified wide format inkjet printer ProL5160 was used to perform inkjet printing of the clear ink.

The wide format inkjet printer ProL5160 (obtained from Ricoh Company, Limited) includes a roll-to-roll printing machine and heaters for before, during, and after printing as illustrated in FIG. 3, and can perform printing while controlling the temperature.

—Print Medium—

Print media used were digitally printed wallpaper PROW400F and PRSO201H obtained from LINTEC SIGN SYSTEM, INC. Before printing with the clear ink, each of the print media was printed in advance with a solid image of four-color composite black of CMYK using the wide format inkjet printer ProL5160 (obtained from Ricoh Company, Limited).

—Printing Method—

Each of the print media printed with the color image was set in the wide format inkjet printer ProL5160 charged with the clear ink, to print the clear ink on the color image.

The heating temperature was set to 40 degrees Celsius for before the printing (pre-heater), 40 degrees Celsius for during the printing (print heater), and 60 degrees Celsius for after the printing (post-heater).

The printing was performed over the full width of the print medium. In the printing, the amount of the clear ink to be discharged per unit area of the print medium was set to 13 g/m$^2$ and the print productivity of the clear ink was set to 20 m/hour.

The print medium after the printing was wound up at a winding-up portion. The print medium was wound up in 10 roles with the printed image facing outward, followed by being left to stand still for 12 hours. After left to stand still, the wound print medium with the printed image was returned to the original state, to confirm the image (for evaluation of blocking resistance) and then perform evaluation of scratch resistance.

—Method for Evaluating Blocking Resistance—

After left to stand still, the wound print medium with the printed image was returned to the original state, to confirm the image (for evaluation of blocking resistance). Specifically, whether failures such as offset to the printed image had occurred was confirmed. Image defects were evaluated. Rating 5 is the best and Rating 1 is the worst. Ratings 3 or higher are acceptable levels in actual use.

<Scratch Resistance Test>

The sample after the evaluation for blocking resistance was cut out and tested for scratch resistance.

The print medium was set in a Gakushin-Type abrasion tester (a friction tester type II) (instrument name: DYE FRICTION FASTNESS TESTER AR-2(BC), obtained from Intec Co., Ltd.), and scratched in a go-and-return manner 100 times, 250 times, and 500 times with a friction tool (with a load of 200 g) of which contact portion was equipped with white cotton fabric (compliant with JIS L 0803, standard adjacent fabric for dyed color fastness test, shirting No. 3). The coating film after the test was visually observed and rated. Results are presented in Table 3-1 and Table 3-2. Ratings 3 or higher in the test of 100 times of go-and-return are pass levels.

[Evaluation Criteria]

Rating 5: No scratch marks were observed on the printed surface, and no ink color transfer to the white cotton fabric was observed.

Rating 4: No scratch marks were observed on the printed surface, but a slight ink color transfer to the white cotton fabric was observed.

Rating 3: When observed from a close position, color change and gloss change were observed on the scratched portion, and a slight ink color transfer to the white cotton fabric was observed.

Rating 2: When observed from a distant position, color change and gloss change were observed on the scratched portion, or an apparent ink color transfer to the white cotton fabric was observed.

Rating 1: The background of the print medium was partially exposed.

Example 2

Inkjet printing was performed in the same manner as in Example 1, except that unlike in Example 1, the amount of the clear ink discharged per unit area of the print medium was changed to 17 g/m², and the evaluation was performed in the same manner as in Example 1.

Examples 3 to 7

Inkjet printing was performed in the same manner as in Example 2, except that unlike in Example 1, the clear ink A was changed to the clear inks B to F, and the evaluation was performed in the same manner as in Example 1. Results are presented in Table 3-1.

Example 8

Inkjet printing was performed in the same manner as in Example 2, except that unlike in Example 2, the printing performance using the clear ink was changed to 28 m/hour, and the evaluation was performed in the same manner as in Example 1.

Examples 9 to 11

Inkjet printing was performed in the same manner as in Example 8, except that unlike in Example 2, the clear ink A was changed to the clear inks G to 1, and the evaluation was performed in the same manner as in Example 1.

Comparative Examples 1 to 3

Inkjet printing was performed in the same manner as in Example 2, except that unlike in Example 2, the clear ink A was changed to the clear inks J to L, and the evaluation was performed.

Comparative Example 4

Inkjet printing was performed in the same manner as in Example 8, except that unlike in Example 8, the clear ink A was changed to the clear ink M, and the evaluation was performed. In Comparative Example 4, the rating of the blocking resistance of the wallpaper PROW400F was 2, which was not an acceptable level. Thus, evaluation for scratch resistance was not performed.

Comparative Example 5

The evaluation for scratch resistance was performed in the same manner as in Example 1, except that unlike in Example 1, the print medium having the color image before printing of the clear ink A was used. In Comparative Example 5, the rating in the test of 100 times of go-and-return was very bad (Rating 1) and thus tests of 250 times of go-and-return and 500 times of go-and-return were not performed. Results are presented in Table 3-2.

TABLE 3-1

|  |  |  | Examples | | | | | | | | | | |
|---|---|---|---|---|---|---|---|---|---|---|---|---|---|
|  |  |  | 1 | 2 | 3 | 4 | 5 | 6 | 7 | 8 | 9 | 10 | 11 |
| Printing conditions of clear ink | Kinds of clear ink used | | A | A | B | C | D | E | F | A | G | H | I |
| | Amount of clear ink discharged (g/m²) | | 13 | 17 | 17 | 17 | 17 | 17 | 17 | 17 | 17 | 17 | 17 |
| | Printing speed of clear ink (m/hr) | | 20 | 20 | 20 | 20 | 20 | 20 | 20 | 28 | 28 | 28 | 28 |
| | Temperature control | Pre-heat (° C.) | 40 | 40 | 40 | 40 | 40 | 40 | 40 | 40 | 40 | 40 | 40 |
| | | Print heat (° C.) | 40 | 40 | 40 | 40 | 40 | 40 | 40 | 40 | 40 | 40 | 40 |
| | | Post-heat (° C.) | 60 | 60 | 60 | 60 | 60 | 60 | 60 | 60 | 60 | 60 | 60 |
| Evaluation results wallpaper: PROW400F | Scratch resistance test Rating | After 100-time test | 3 | 5 | 5 | 5 | 5 | 5 | 5 | 5 | 5 | 5 | 5 |
| | | After 250-time test | 2 | 4 | 4 | 4 | 4 | 3 | 5 | 4 | 4 | 4 | 4 |
| | | After 500-time test | 1 | 2 | 3 | 3 | 3 | 2 | 4 | 2 | 2 | 2 | 2 |
| | Blocking resistance test Rating | | 5 | 5 | 5 | 5 | 5 | 5 | 5 | 3 | 5 | 5 | 5 |

TABLE 3-1-continued

| | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Evaluation results wallpaper: PRSO201H | Scratch resistance test Rating | After 100-time test | 5 | 5 | 5 | 5 | 5 | 5 | 5 | 5 | 5 | 5 | 5 |
| | | After 250-time test | 4 | 5 | 5 | 5 | 5 | 5 | 5 | 5 | 5 | 5 | 5 |
| | | After 500-time test | 2 | 3 | 4 | 4 | 4 | 3 | 5 | 3 | 3 | 3 | 4 |
| | Blocking resistance test Rating | | 5 | 5 | 5 | 5 | 5 | 5 | 5 | 5 | 5 | 5 | 5 |

TABLE 3-2

| | | | Comparative Examples | | | | |
|---|---|---|---|---|---|---|---|
| | | | 1 | 2 | 3 | 4 | 5 |
| Printing conditions of clear ink | Kinds of clear ink used | | J | K | L | M | None |
| | Amount of clear ink discharged (g/m$^2$) | | 17 | 17 | 17 | 17 | — |
| | Printing speed of clear ink (m/hr) | | 20 | 20 | 20 | 28 | — |
| | Temperature control | Pre-heat (° C.) | 40 | 40 | 40 | 40 | — |
| | | Print heat (° C.) | 40 | 40 | 40 | 40 | — |
| | | Post-heat (° C.) | 60 | 60 | 60 | 60 | — |
| Evaluation results wallpaper: PROW400F | Scratch resistance test Rating | After 100-time test | 2 | 2 | 2 | — | 1 |
| | | After 250-time test | 2 | 2 | 2 | — | — |
| | | After 500-time test | 1 | 1 | 1 | — | — |
| | Blocking resistance test Rating | | 5 | 5 | 5 | 2 | — |
| Evaluation results wallpaper: PRSO201H | Scratch resistance test Rating | After 100-time test | 3 | 3 | 3 | 5 | 2 |
| | | After 250-time test | 2 | 2 | 3 | 5 | 1 |
| | | After 500-time test | 1 | 1 | 2 | 3 | — |
| | Blocking resistance test Rating | | 5 | 5 | 5 | 5 | — |

Comparing "Examples 1 to 11" with "Comparative Examples 1 to 5", "Examples 1 to 11" in which the clear inks having a resin particle volume average particle diameter of 50 nm or less and containing a compound represented by General Formula (1) were printed and dried films of the clear inks had glass transition temperatures (Tg) at 50 degrees Celsius or higher and at lower than 0 degrees Celsius achieved Ratings 3 or higher in the scratch resistance test of 100 times of go-and-return, and exhibited good scratch resistance. Those "Examples 1 to 11" achieved Ratings 3 or higher in the blocking resistance evaluation, and exhibited a good drying property.

Comparing "Example 2 and Example 6" with "Examples 3, 4, 5, and 7", the clear inks having a mass ratio MA:MB of from 98:2 through 80:20 between the mass MA of resin particles A having Tg at 50 degrees Celsius or higher and the mass MB of resin particles B having Tg at lower than 0 degrees Celsius exhibited good scratch resistance also after 250 times of go-and-return and 50) times of go-and-return.

Comparing "Example 8" with "Examples 9 to 11", the clear inks containing the compound represented by General Formula (1) at 4% by mass or more exhibited good blocking resistance also at a high printing speed of the clear ink.

Comparing "Example 1" with "Example 2", when the amount of the clear ink discharged was 15 g/m$^2$ or more, the clear inks exhibited high scratch resistance under varied conditions of, for example, the kind of wallpaper and the number of go-and-returns in the scratch resistance test.

Aspects and embodiments of the present disclosure are as follows, for example.

<1> A Clear Ink, Including:
resin particles having a volume average particle diameter of 50 nm or less; water; and
a compound represented by General Formula (1) below,

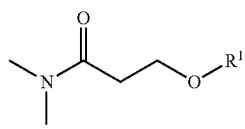

General Formula (1)

where in the General Formula (1), R$^1$ represents an alkyl group having 1 or more but 4 or less carbon atoms,
wherein a dried film of the clear ink has glass transition temperatures (Tg) at 50 degrees Celsius or higher and at lower than 0 degrees Celsius.

<2> The clear ink according to <1> above, wherein a proportion of the compound represented by the General Formula (1) in the clear ink is 4% by mass or more.

<3> The clear ink according to <1> or <2> above, wherein the resin particles include resin particles A and resin particles B, and
the resin particles A have a Tg at 50 degrees Celsius or higher and the resin particles B have a Tg at lower than 0 degrees Celsius.

<4> The clear ink according to <3> above, wherein a mass ratio MA:MB between mass MA of the resin particles A and mass MB of the resin particles B is from 98:2 through 80:20.

<5> The clear ink according to any one of <1> to <4> above, wherein a total proportion of the resin particles in the clear ink is 10% by mass or greater.

<6> The clear ink according to any one of <3> to <5> above, wherein the resin particles A comprise polyurethane resin particles.

<7> A printing method, including:
applying an ink containing a colorant; and
applying the clear ink according to any one of <1> to <6> above.

<8> The printing method according to <7> above, wherein the applying the clear ink includes:
applying the clear ink to a print target at a deposition amount of 15 g/m² or more.
<9> An inkjet printing apparatus, including:
the clear ink according to any one of <1> to <6> above; and
a discharging unit configured to discharge the clear ink.

The clear ink according to any one of <1> to <6> above, the printing method according to <7> or <8>, and the inkjet printing apparatus according to <9> above can solve existing problems in the art and can achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A clear ink, comprising:
resin particles having a volume average particle diameter of 50 nm or less;
water; and
a compound represented by General Formula (1) below:

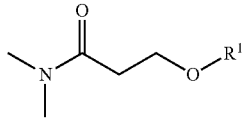

General Formula (1)

where in the General Formula (1), $R^1$ represents an alkyl group having 1 or more but 4 or less carbon atoms,
wherein a dried film of the clear ink has glass transition temperatures at 50 degrees Celsius or higher and at lower than 0 degrees Celsius.

2. The clear ink according to claim 1, wherein a proportion of the compound represented by the General Formula (1) in the clear ink is 4% by mass or more.

3. The clear ink according to claim 1, wherein the resin particles include resin particles A and resin particles B, and
the resin particles A have a glass transition temperature at 50 degrees Celsius or higher and the resin particles B have a glass transition temperature at lower than 0 degrees Celsius.

4. The clear ink according to claim 3, wherein a mass ratio MA:MB between mass MA of the resin particles A and mass MB of the resin particles B is from 98:2 through 80:20.

5. The clear ink according to claim 1, wherein a total proportion of the resin particles in the clear ink is 10% by mass or greater.

6. The clear ink according to claim 3, wherein the resin particles A comprise polyurethane resin particles.

7. A printing method, comprising:
applying an ink containing a colorant; and
applying the clear ink according to claim 1.

8. The printing method according to claim 7, wherein the applying the clear ink includes:
applying the clear ink to a print target at a deposition amount of 15 g/m² or more.

9. An inkjet printing apparatus, comprising:
the clear ink according to claim 1; and
a discharging unit configured to discharge the clear ink.

* * * * *